(12) United States Patent
Noonan et al.

(10) Patent No.: US 8,087,216 B2
(45) Date of Patent: Jan. 3, 2012

(54) COTTON HARVESTER FOR PRODUCING MODULES WHICH CAN BE AUTOMATICALLY IDENTIFIED AND ORIENTED

(75) Inventors: James Thomas Noonan, Boundurant, IA (US); Donald Lee Goodrich, Waterloo, IA (US); Jesse Dru Haecker, Ankeny, IA (US); Jerry Bob Hall, Johnston, IA (US); Mark Alan Cracraft, Urbandale, IA (US); Earl Franklin Canfield, Dunkerton, IA (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 12/712,484

(22) Filed: Feb. 25, 2010

(65) Prior Publication Data
US 2010/0186606 A1 Jul. 29, 2010

Related U.S. Application Data

(62) Division of application No. 11/928,338, filed on Oct. 30, 2007, now Pat. No. 7,694,491.

(51) Int. Cl.
*B65B 11/04* (2006.01)
*B65B 65/04* (2006.01)
(52) U.S. Cl. ............... 53/461; 53/211; 53/135.3; 100/4; 100/5
(58) Field of Classification Search .................... 53/211, 53/216, 461, 582, 587, 135.3, 135.2, 409, 53/430, 441, 113, 140, 556; 100/4, 5
See application file for complete search history.

(56) References Cited

U.S. PATENT DOCUMENTS

| 4,779,526 | A | 10/1988 | Frerich et al. |
|---|---|---|---|
| 5,152,123 | A | 10/1992 | Viaud et al. |
| 5,349,806 | A | 9/1994 | Swearingen et al. |
| 5,979,141 | A | 11/1999 | Phillips |
| 6,263,650 | B1 | 7/2001 | Deutsch et al. |
| 6,370,852 | B1 | 4/2002 | Ohlemeyer et al. |
| 6,966,162 | B2 * | 11/2005 | Viaud et al. ................ 53/64 |
| 7,243,476 | B2 | 7/2007 | Schneider |
| 7,785,057 | B2 * | 8/2010 | Noonan et al. ............ 414/412 |
| 2002/0195195 | A1 * | 12/2002 | Grabau et al. ............. 156/300 |
| 2006/0244662 | A1 * | 11/2006 | Bauer et al. ......... 343/700 MS |
| 2007/0089390 | A1 * | 4/2007 | Hendrickson et al. ..... 56/10.2 F |
| 2007/0152010 | A1 * | 7/2007 | Denen et al. ................ 225/10 |
| 2007/0240389 | A1 * | 10/2007 | Frerichs ..................... 53/587 |
| 2008/0307754 | A1 | 12/2008 | Storig et al. |

* cited by examiner

*Primary Examiner* — Paul Durand

(57) ABSTRACT

RFID tags pre-installed on bale wrap segments provide location information for a specific area of the bale wrap. RFID tag readers located on the cotton harvester provide signals for use by the module wrapping apparatus for initiating a cutting or separating operation, once a module has been wrapped, and for warning an operator of a situation where the wrapping function has not proceeded in an orderly fashion after a signal for starting the wrapping function has been received. A wrapped module carries the pre-installed RFID tags which are readable by RFID readers carried by module handlers in the field and/or at the gin input which identify the modules and establish a position to which the module may be automatically oriented so that an ideal module wrap cutting location is easily calculated. The RFID tag reading taken in the field or at the gin thus senses the number on the tag as well as the location of the tag, and the module identification is input to an electronic database.

8 Claims, 4 Drawing Sheets

COTTON HARVESTER FOR PRODUCING MODULES WHICH CAN BE AUTOMATICALLY IDENTIFIED AND ORIENTED

CROSS REFERENCE TO RELATED APPLICATIONS

This application is a divisional of U.S. patent application Ser. No. 11/928,338, filed 30 Oct., 2007, now U.S. Pat. No. 7,694,491.

FIELD OF THE INVENTION

The present invention relates generally to wrapped bales or modules and, more specifically, to identification of cotton or similar crop modules and orientation of the modules relative to a specific location on the wrapper.

BACKGROUND OF THE INVENTION

It is known in the process of harvesting seed cotton, corn stover, hay or other products to use a module forming apparatus, such as a baler, to produce wrapped cylindrical modules or bales of the harvested product. U.S. Pat. No. 6,263,650, granted on Jul. 24, 2001 discloses a cotton harvester which embodies a module forming apparatus equipped with a module wrapping apparatus.

It is desired to be able to automatically trace the harvested product as it is produced along with associated information which might include customer name, field number, weight, average yield where module is produced, moisture content, module diameter, seed variety, and GPS location and associated mapping data;

Another desire is for a combined round module forming and wrapping apparatus to have the capability of separating a predetermined length of wrapping material from a wrapping material supply roll for applying a desired number of wraps to the circumference of a module having a pre-selected diameter. This would include separating pre-partitioned lengths of wrapping material from the supply roll (see U.S. Pat. No. 6,787,209, granted on Sep. 7, 2004 for an example of wrapping material supply rolls including pre-partitioned lengths of wrapping material), or would include defining at what point to cut the predetermined length of wrapping material from the supply roll. A related desired feature is to be able to know how many predetermined or pre-partitioned lengths of wrapping material remain on the supply roll once a bale is wrapped.

In conjunction with the wrapping apparatus, it is also desired that there be confirmation that the bale or module has been successfully wrapped before it is ejected from the baling or module forming apparatus.

Once the bale or module is ejected onto the ground from the baling or module forming arrangement, there may be a need for reliably determining the orientation of the bale if there is a need to position the bale in a particular orientation relative to a wrap location, such as when a particular wrap area on the bale provides added protection against moisture (U.S. Pat. No. 7,093,407, granted Aug. 22, 2006 discloses a way of marking a wrapped bale so that it can later be properly oriented for maximum protection against ground moisture).

In the case of wrapped cotton bales or modules arriving at a gin, the wrapper must be cut at a specific location to prevent formation of a loose inner tail that can become separated from the remainder of the removed wrap and can enter into the gin system. The first length of wrapping material entering the bale chamber on the harvester or processor typically does not bond well with the next adjoining layer of wrap. After about six feet (two meters) of wrapping material are applied to the circumference of the module or bale, the tension and tackiness of one side of the wrapping material helps bond the inner layer to the second layer. Although it is known to provide apparatus for removing wrappers from modules at the cotton gin (for example, see U.S. Pat. No. 7,165,928, granted Jan. 23, 2007), a reliable method and apparatus for determining the location of the loose inner tail and cutting the wrap at a location offset from the tail is necessary to avoid gin contamination with plastic tail material. If the bales vary in size, the positioning process becomes more difficult.

Another need at the gin is automatic identification of the order that modules are passing down the gin feeder floor. An identification system used today requires a worker to physically place identification tags on modules in the field, and to remove the tag from a given module and maintain it in order with other prior and post tags for grower quality identification and payment purposes.

There is a need then to automatically place an identification marker on a cotton bale or module so that the module may be identified and tracked from the time it leaves the bale or module forming and wrapping arrangements until the time it enters the gin.

SUMMARY OF THE INVENTION

According to the present invention, there is provided a control arrangement for a combined module forming apparatus and module wrapping apparatus.

A broad object of the invention is to provide such a control arrangement that includes a wrap material separating device for automatically separating pre-partitioned or predetermined lengths of wrapping material from a material supply roll during the process of wrapping a cylindrical module or bale in the module or bale forming chamber.

This object is achieved by resorting to radio frequency identification (RFID) technology including RFID transponders, which are sometimes referred to as tags, and RFID tag readers. As applied here, a plurality of low cost RFID tags, including a radio frequency integrated circuit (RFIC) and an antenna are each positioned on a substrate that is affixed, as by an adhesive, at strategic locations on each predetermined or pre-partitioned length of wrapping material before the wrapping process is begun in the bale chamber. In one embodiment of the invention, tags are placed strategically at three locations on each predetermined or pre-partitioned length of wrapping material to allow RFID reading capability under various conditions or functions. A duplicate tag, with the same identification number as the first, may be placed at each of the three locations to guarantee a reading at those locations even if one tag were to fail. Considered when the predetermined or pre-partitioned length of wrapping material is applied to a bale or module, a first RFID tag is located near an outer tail end of, and offset to one side of, the length of wrapping material in a position for being read by a first RFID tag reader located on either the module forming apparatus or module wrapping apparatus. A second RFID tag is centrally located in an inner tail region for being read by a second RFID tag reader located on the baling apparatus near the entrance to the baling chamber, with the orientation and power level of the second reader being such that it will detect the second RFID tag only after one complete wrap of material has been applied to the bale. An absence of such a reading after the wrapping cycle has begun would be an indicator that something is amiss in the operation and the operator could be apprised of this fact by a warning so that a bale is not ejected before being properly wrapped. The second RFID tag reader could be provided at an alternate location adjacent an upper region of the baling chamber. A third RFID tag is provided at a location spaced a fixed amount from the first location chosen such that there is no chance that all three of the RFID tags applied to the bale would be in ground contact at the same time so as to prevent at least one of the tags from being read by a hand-held or machine borne reader once the bale is discharged onto the ground.

An RFID reader at the gin input determines the inner tail location from the tag location as the module is rotated during processing. Such rotation may be performed by a loader for loading the module onto the gin inlet conveyor floor having the capability for supporting and rotating the module about its axis so that a wrap location offset approximately 180 degrees from the inner tail is aligned with the cutting device, the loader being equipped with an RFID tag reader which senses the number and other information contained on the tag as well as the location of the tag, and the module identification is input to an electronic database of an on-board computer that is coupled to the RFID tag reader.

Thus, it will be appreciated that the use of RFID technology has several advantages for logistics and inventory control of cotton modules during the entire cycle from module creation to lint bale creation. By pre-installing RFID tags into the predetermined or pre-partitioned lengths of wrap material ahead of actual creation of the round bales or modules, an RFID reader on-board the round module forming machine can be used to determine when a module has been created. In addition, the RFID tags can be used to angularly position round wrapped modules on the ground to take advantage of the overlapping wrap areas or special non-pervious areas on the wrap for improved module protection.

The ideal cut location for the wrapper can be easily determined for any wrapping orientation and diameter of a module going down a feeder floor. The manual operation of removing a physical tag is eliminated. By using RFID technology, the chance of human error in keeping track of the order of modules going down the feeder floor is significantly reduced, and the module order is now in an electronic database form available for other post-processing.

These and other objects, features and advantages of the present invention will become apparent from the description below in view of the drawings.

DESCRIPTION OF THE PREFERRED EMBODIMENT

Figure 1:
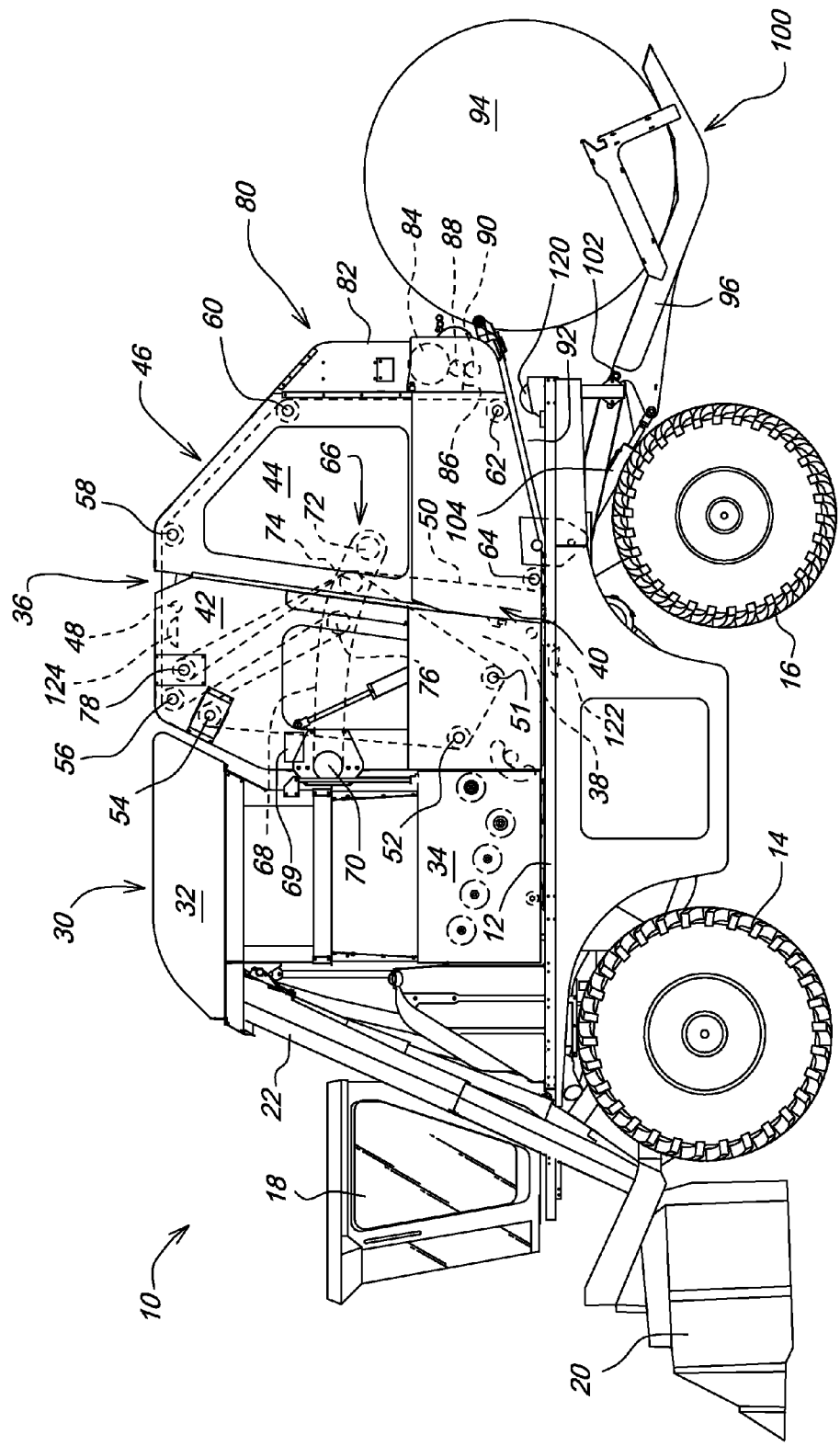
FIG. 1 is a schematic left side view of a seed cotton harvesting machine incorporating a baling device equipped with a wrapping apparatus for wrapping a cylindrical cotton module formed in the baling chamber.

Referring now to FIG. 1, there is shown a self-propelled cotton harvester 10 including a main frame 12 supported for movement by forward drive wheels 14 and rear steerable wheels 16. An operator's station or cab 18 is supported at a forward location on an elevated region of the frame so as to provide an operator a clear view of a cotton harvesting head 20 mounted to a forward end of the frame 12, which removes cotton from plants and directs the removed cotton into an air conveying system including an air duct arrangement 22.

An upright cotton accumulator arrangement 30 with an upper inlet structure 32 and a metering floor 34 is supported on the frame 12 behind the cab 18 for receiving the cotton from the air duct arrangement 22. A selectively operable cotton processor which, as shown, is a large cylindrical module- or bale-forming apparatus or arrangement 36 supported rearward of the accumulator arrangement 30. The accumulator arrangement 30 stores cotton as necessary, and the metering floor 34 uniformly distributes the cotton into a module-forming chamber 38, by way of a chamber inlet 40.

The module-forming chamber 38 is broadly similar to the bale-forming arrangement of the large round baler disclosed in U.S. Pat. No. 5,979,141, granted 9 Nov. 1999, in that it includes opposite sides having a forward region defined by a pair fixed, transversely spaced side walls 42, which are joined to the main frame 12, and a rear region defined by a pair of transversely spaced side walls 44 that form opposite sides of a discharge gate 46, which is mounted to an upper rear location of the fixed side walls 42 for pivoting vertically about a horizontal axis defined by a pivot assembly 48, between a lowered, module-forming position, as shown, and a raised module-discharge position. The circumference of the module-forming chamber 38 is defined by a module-forming arrangement including a plurality of endless belts 50 supported in side-by-side relationship across a support roll arrangement comprising a plurality of fixed rolls and a plurality of movable rolls. Specifically, proceeding clockwise from an upper boundary of the chamber inlet 40, the fixed rolls include a bottom front roll 51, a lower front roll 52, an upper front roll 54, and a top front roll 56 all extending between and having opposite ends rotatably mounted to the fixed side walls 42. Continuing on, the fixed rolls further include a top front gate roll 58, an upper rear gate roll 60 a bottom rear gate roll 62 and a bottom front gate roll 64 all extending between and having opposite ends rotatably mounted to the gate side walls 44. A belt tensioning arm arrangement 66 comprises a pair of transversely spaced arms 68 having forward ends joined to a transverse tube that extends between, and is pivotally mounted, as at a pivot arrangement 70, to a middle front region of the fixed side walls 42. The plurality of movable rolls comprise three rolls 72, 74 and 76, which extend between and have opposite ends respectively rotatably mounted to the arms 68 of the tensioning arm arrangement 66. The roll 72 is located at a rear end of the arms 68, the roll 74 positioned in adjacent spaced relationship to the roll 72, and the roll 76 is spaced toward the pivot arrangement 70 from the roll 74.

Beginning at the bottom front roll 51, the endless, module-forming belts 50 are looped under the roll 51 and include an outer run which is engaged serially with the lower front roll 52, the upper front roll 54, the movable roll 76, the top front roll 56, the top front gate roll 58, the upper rear gate roll 60, the lower rear gate roll 62, and the lower front gate roll 64. An inner run of the belts 50 includes a loop engaged over a top rear fixed roll 78, which extends between an upper rear region of the fixed side walls 42, with the loop being positioned between the movable rolls 72 and 74. As shown, the tensioning arm arrangement 66 is in an initial, lowered position corresponding to when the module-forming chamber 38 is in an empty condition, with the module-forming belts defining a generally triangular shape, as viewed from the side. The tensioning arm arrangement 66 normally includes tensioning elements such hydraulic cylinders and/or springs (not shown, but well known) which are mounted between the fixed walls 42 and the arms 68 so as to yieldably resist their upward movement as the module-forming chamber 38 becomes filled with cotton. As shown, one or more of the fixed rolls are driven so as to cause the belts 50 to be driven, with the drive direction being such as to cause the incoming cotton to travel counterclockwise as it is added as a spiral layer to the growing cotton module. As the module grows within the chamber 38, the arms 68 of the tensioning arm arrangement 66 rotate counterclockwise until a module having a predetermined diameter has been formed in the chamber 38, this diameter being sensed by a module size sensor 69, having a purpose explained below.

Figure 3:
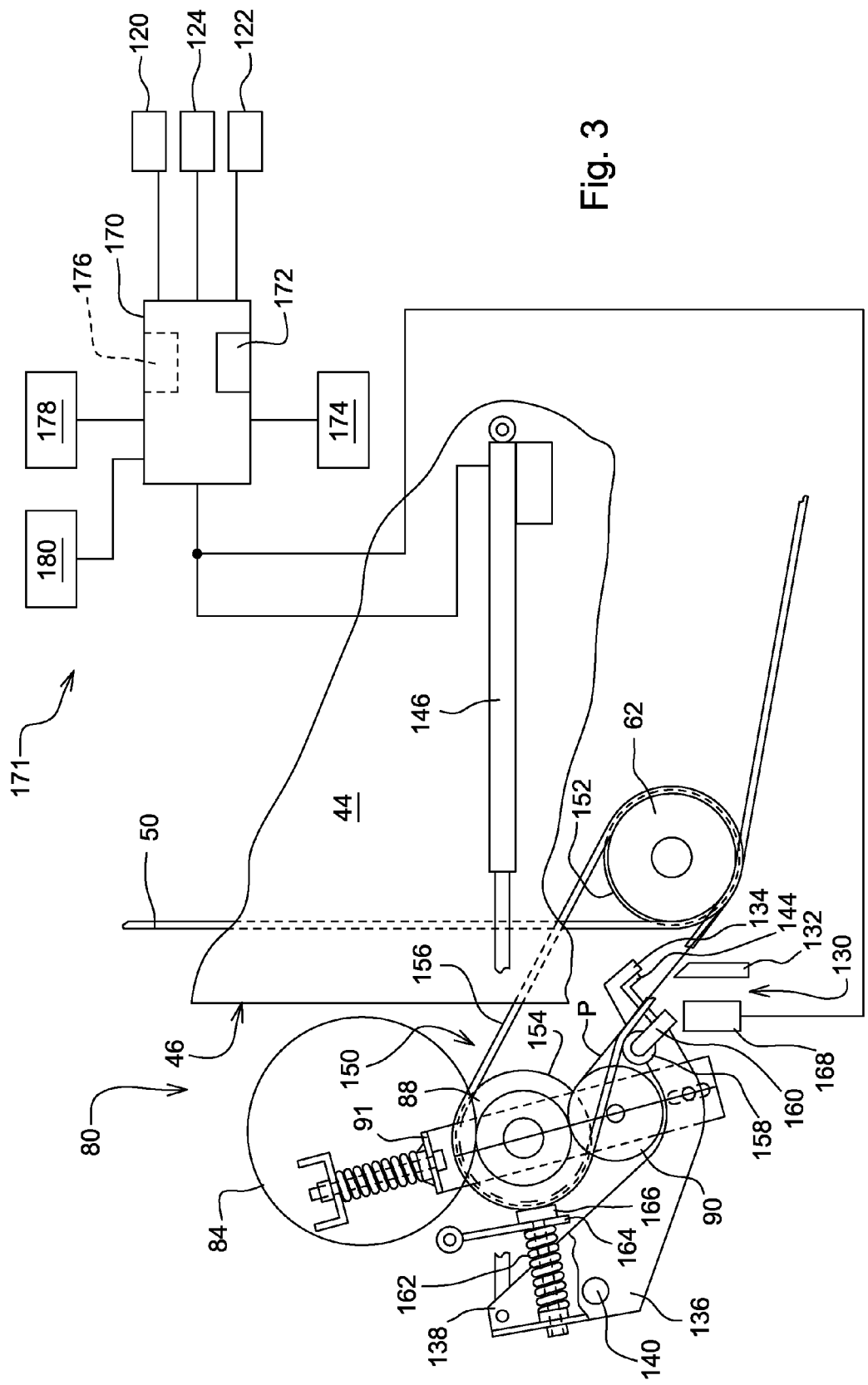
FIG. 3 is a schematic view showing that part of the control for module forming machine and the wrapping apparatus used in effecting separation of the predetermined or pre-partitioned lengths of the wrapping material from the wrapping material supply roll during the module wrapping operation.

A module or bale wrapping apparatus or arrangement 80 is mounted to a rear wall of the discharge gate 46 and includes a cover 82 hinged at its top and covering an active wrapping material supply roll 84 consisting of wrapping material 86. The wrapping material 86 used here is preferably, but not necessarily, formed from semi-permeable plastic sheet. An end section of the wrapping material 86 extends downwardly from a forward side of the supply roll 84 and is fed between upper and lower wrap material feed rolls 88 and 90, respectively. With reference also to FIG. 3, it can be understood that the upper roll 88 has its opposite ends mounted for rotation in brackets 91 that are mounted for sliding and are spring biased so that the upper roll 88 is yieldably biased downwardly into engagement with the lower roll 90. The upper roll 88 is positioned slightly to the rear of the lower roll 90 so that a common tangent to the rolls, at their line of contact, extends upwardly and forwardly toward a vertical run of the module-forming belts 50. Upon driving the feed rolls 88 and 90, in a manner described below, the wrapping material 86 exiting the feed rolls 88 and 90 is delivered against the vertical run of the belts 50 and carried to a wrapping material guide structure 92 which extends beneath a lower run of the belts 50, the belts 50 acting to carry the wrapping material 86 along the guide structure 92, and then around the lower front gate roll 64 and into the module-forming chamber 38, by way of the chamber inlet 40, the wrapping material 86 then being trapped between the module-forming belts 50 and a completed cotton module 94 located in the expanded baling chamber 38. Thus, a wrapping material feed device is defined, at least in part, by the feed rolls 88 and 90, the module-forming belts 50 and the material guide structure 92. The speed at which the wrapping material 86 is moved by the belts 50 and, rotating module 94 is greater than the speed at which it is delivered by the feed rolls 88 and 90, causing the wrapping material 86 to be tensioned and stretched as it is wrapped about the module 94. Once a desired length of the wrapping material (1.5 to 2 wraps, for example) is wrapped about the cotton module 94, the drive to the feed roll 88 is discontinued and a cutting mechanism, described in more detail below, is actuated so as to separate the material being wrapped about the module 94 from the material supply roll 84.

A wrapping material cut-off or separation device 130 is provided for selectively separating the supply roll 84 from a length of wrapping material that is being wrapped about a completely formed module 94 located in the baling chamber 38. The cut-off or separation device 130 includes an upstanding, horizontal, transverse cutting blade 132 fixed rearward of the lower rear gate roll 62 and having a cutting edge 134 disposed just below a path P extending tangent to an upper front location of the lower feed roll 90 and a lower rear location of the gate roll 62, and followed by the wrapping material 86 during the wrapping of a bale. A pair of curved arms 136 and 138 have respective rear ends fixed to right- and left-hand end regions of a cross shaft 140 mounted for pivoting about a horizontal, transverse axis located behind the feed rolls 88 and 90. Respective forward ends of the arms 138 and 140 are joined by a horizontal, transverse, angle-shaped anvil 144 that is disposed above, and on the opposite side of the path P from, the blade cutting edge 134. This position of the arms 138 and 140 holds the anvil 144 in a stand-by position occupied when a bale is being wrapped, for example. Once wrapping of the bale is substantially completed, the anvil 144 is moved downwardly so as to engage the wrapping material 86 located along the path P and bring it into engagement with the blade cutting edge 134, with the anvil 144 then being in a cutting position. Movement of the anvil 144 between its stand-by and cutting positions is selectively accomplished by operation of an extensible and retractable actuator, here depicted as an electric linear motor 146 having its output connected between the right side wall 44 and an upper rear location of the right-hand arm 136. Thus, as viewed in FIG. 3, retraction of the linear motor 146 will cause the arms 136 and 138 to be pivoted clockwise.

A belt drive 150 is provided for driving the upper feed roll 88 and includes a drive pulley 152 coupled to a left end of the lower rear gate roll 62, a driven pulley 154 coupled to a left end of the feed roll 88, a drive belt 156 engaged with the pulleys 132 and 134 and a tensioning roll 158 mounted to the end of an arm 160 that is pivotally mounted to the left-hand arm 138 and biased so that the tensioning roll 158 is resiliently biased, as by a torsion spring (not shown) acting between the arms 138 and 160, into engagement with a lower run of the belt 156 when the arms 136 and 138 are positioned for holding the anvil 144 in its stand-by, position, as shown in FIG. 3. When the arms 136 and 140 are pivoted clockwise by retraction of the linear motor 146, the tensioning roll 158 is moved away from the belt 156 so as to permit the drive belt 156 to become slack, thus, disconnecting the drive between the gate roll 62 and the feed roll 88. At the same time, a braking force is applied to the feed roll 88 by a braking device comprising an adjustable stop 162, a pivotally suspended braking arm 164 and a brake pad 166. Specifically, the stop 162 is carried at an upper rear location of the left-hand arm 138 and is located closely adjacent a rear face of the brake arm 164, which has the pad 166 affixed to its forward face and is positioned behind the pulley 134. The stop 162 is positioned so as to cause the arm 164 to pivot towards, and apply the brake pad 166 against, the pulley 154 when the arm 138 is pivoted clockwise, as viewed in FIG. 3. This results in a length of the wrapping material 86, which extends between the feed rolls 88,90 and the bale 94 being wrapped being tensioned which aids the cutting action.

A knife-operation sensor 168 is used for providing a signal to a computer 170, forming part of a electronic control arrangement 171 for the module forming apparatus 36 and the module wrapping apparatus 80, located in the cab 18 of the harvester 10 for initiating operation of a pair of hydraulic gate cylinders (not shown), which are coupled between the fixed side walls 42 and the gate side walls 44, as is well known, for causing the discharge gate 46 to be pivoted to its raised discharge position for permitting the wrapped module 94 to roll onto a cradle-shaped framework 96 of a module discharge arrangement 100.

The framework 96 of the module discharge arrangement 100 is pivotally mounted, as at 102, to a rear end region of the main frame 12 for swinging vertically between a raised, module-receiving position, as shown, and a lowered, module-depositing position for permitting the module 94 to roll off the framework 96 onto the ground. The framework 96 is moved between its raised and lowered positions by a pair of hydraulic actuators 104 mounted between the frame 12 and the framework 96. The module discharge arrangement 100 may be operated such that two cotton modules 94 are deposited on the ground close to each other for subsequent handling by leaving a first wrapped module 94 on the framework 96 during formation and wrapping of a second module 94, with the first module 94 being deposited on the ground shortly before the framework 96 is positioned for receiving and then depositing the second wrapped module 94. For the purpose of generating data for cotton yield mapping, a cotton module weight measuring device (not shown) may be associated with the module discharge arrangement 100 so as to produce a weight signal, when a cotton module is resting on the cradle defined by the framework 96, with the weight measuring device being coupled to the computer 170. At the same time, the location in the field where the weighed module was produced is determined by a global positioning system including a signal transmitter (not shown) carried by the harvester 10.

Figure 2:
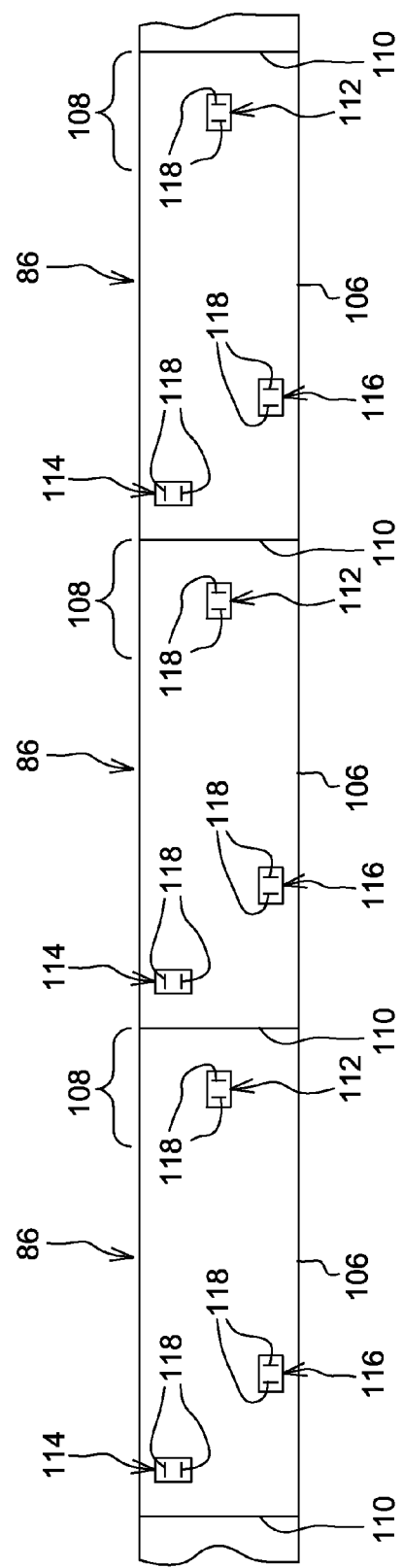
FIG. 2 is a schematic top view showing a section of wrapping material including several interconnected predetermined or pre-partitioned lengths of wrapping material, to each of which three RFID tag assemblies have been attached.

In order to aid in the handling and identification of the modules 94 subsequent to their being deposited on the ground, the wrapping material 86 is preferably manufactured to include a plurality of electronic identification tags, such as radio frequency identification (RFID) tags, for example. Specifically, with reference to FIG. 2 there is shown a length of the wrapping material 86 including three identical segments 106, with each segment being a predetermined length sufficient for providing a desired number of wraps about the circumference of a module 94 having a predetermined diameter. Thus, each of the wrapping material supply rolls 84 is manufactured to wrap a given number of modules having a predetermined diameter. As considered when wrapped about a given module 94, each of the segments 106 includes an inner tail section 108 and an outer tail end 110, with the section 108 and tail end 110 being joined together prior to being separated by the cut-off or separation device 130 of the module wrapping system 80. As considered when being fed into the module-forming chamber 38, the inner tail section 108 may alternatively be called a leading tail section while the outer tail end 110 may alternatively be called a trailing end. Because of the nature of how the wrapping material 86 enters the module-forming chamber 38 during the wrapping function, the first six feet or so of the inner tail section 108 does not bond well with the next adjacent layer of the wrapping material 86. After approximately six feet of wrapping material becomes engaged with the module, wrap tension and tackiness of one side of the wrapping material 86 helps bond the inner layer of the wrapping material to the second layer.

It is possible that adjacent segments 106 of the wrapping material 86 may be joined together at a lapped joint connected together by an adhesive which permits separation of the joint upon the application of a predetermined tensile force to the lapped joint. U.S. Pat. No. 6,787,209 discloses a plastic wrapping material utilizing such lapped joints. When using a wrapping material 86 consisting of a plurality of sections coupled end-to-end at lapped joints, no cutting mechanism is required to separate the segments 106 one from another. Rather, all that is required is to apply a braking force to the wrapping material feed roll 88, such as with the brake arm 164 and brake pad 166 described above, with the wrapping action of the module 94 and module-forming belts 50 creating the tensile force necessary for separating the joint. Separation of the joint exposes adhesive on the outer end section of the wrapping material segment 106 adjacent the outer tail end 110 which serves to adhere the outer end section to the underlying layer of wrapping material 86.

In any event, each of the identical segments 106 of the wrapping material 86 is provided with three RFID tag assemblies 112, 114 and 116, which each include a paper backing into which two RFID tags 118 are incorporated, the purpose of the two tags 118 being to provide a redundancy in the event one of the tags is defective.

The RFID tag assemblies 112, 114 and 116 are strategically placed on each wrapping material segment 106 to allow RFID tag reading capability under various conditions or functions, as is explained below. The tag assembly 112 is fixed to the wrapping material 86 at a location centered within the inner tail section 108. The RFID tag assembly 114 is attached to the wrapping material 86 at a location adjacent one of its lateral sides and spaced in trailing relationship to the outer tail end 110, as considered in the direction the wrapping material 86 travels during wrapping operation. The RFID tag assembly 116 is attached to the wrapping material 86 at a location adjacent an opposite side from, and in leading relationship to, the location of the RFID tag assembly 114. The base identification number of each of the six tags of the three tag assemblies 112, 114 and 116 is identical. To differentiate the tag assembly 114 from the tag assemblies 112 and 116, different suffixes are used as part of the numbering scheme, with it being noted that RFID readers can be made to screen for certain suffix locations.

Referring again to FIG. 1, an RFID tag reader 120 is provided on an upper rear location of the vehicle frame 12 adjacent a rear underside region of the wrapping material guide structure 92. During wrapping operation, when the reader 120 identifies the presence of the tag assembly 114, a tag identification signal can be sent to the on board computer 170, which sends a separate signal to the electric linear motor 146 of the cut-off or separating device 130 to cause operation of the cut-off or separating device 130 for separating the lead wrapping material segment 106 from the adjacent following segment 106. Another RFID tag reader 122 is provided at a location adjacent the inlet 40 of the module-forming chamber 38. The reader 122 is positioned such that it will detect the tag assembly 114, regardless of the diameter of the cotton module 94 being formed. The orientation and power level of the RFID tag reader 122 is such that at least one wrap must be completed during the wrapping process before the reader will identify the tag assembly 114. In the event that the tag assembly 114 is not identified within a certain time, as determined by a timer 172, after a signal has been sent to the computer 170 to initiate the wrapping operation, a warning device 174, that is coupled to the computer 170, is energized to provide a warning to the operator to help prevent the operator from letting the module 94 exit the machine 10 prior to being wrapped. An alternate RFID tag reader 124 is mounted to a support extending between an upper region of the fixed side walls 42 located beneath an upper horizontal run of the module-forming belts 50. The tag reader 124 would also be oriented and powered so as to be capable of confirming that tag assembly 114 has made it into the module-forming chamber 38.

Wrapping operation may be automatically initiated upon the bale size sensor 69 sending out a size signal which corresponds to a pre-selected size placed in the memory of the computer 170 by an input key 178 coupled to the computer 130. The computer 170 will then send a feed initiate signal to the linear motor 146, causing the latter to extend, thereby bringing the tensioning roll 158 into engagement with the drive belt 156 so as to effect the drive connection between the lower rear gate roll 62 and the feed roll 88. The feed rolls 88 and 90 then counter-rotate so as to feed the leading end of the leading segment 106 of the wrapping material 86 against the vertical run of the belts 50 which carries the wrapping material downwardly and beneath the roll 62 where it is moved along the guide structure 92 and into the baling chamber 38. At this time the completed module 94 is rotating and the wrapping material 86 is carried along with the module 94 and belts 50. The leading wrapping material segment 106 is cut-off or separated from the adjacent following segment, in the manner described above, when the tag reader 120 reads the signal emitted by the RFID tag 114 and provides an input signal to the computer 171.

By taking advantage of the hexadecimal system used for RFID tag identification, supply rolls 84 of the wrapping material 86 can be configured so that a given portion of a supply roll 84 can be individually identified, with a segment count-down arrangement 176 of the circuit tracking this information. One possible use of this information is to give notice to an operator, by way of a display 178, for example, as to how many wrap segments 106 are still left on the supply roll 84 so that the operator knows when a new supply roll 84 of wrapping material 86 must be loaded into the wrapping mechanism 80.

Aside from providing information concerning the location of a given segment 106 of the wrapping material 86 during the wrapping operation, the RFID tags 112, 114, and 116 can be set up to correlate a given wrapped module 94 with other information, including the grower's name, seed variety, field number, module diameter, module weight, module moisture content, average yield where module is produced, and GPS location and associated mapping data.

Figure 4:
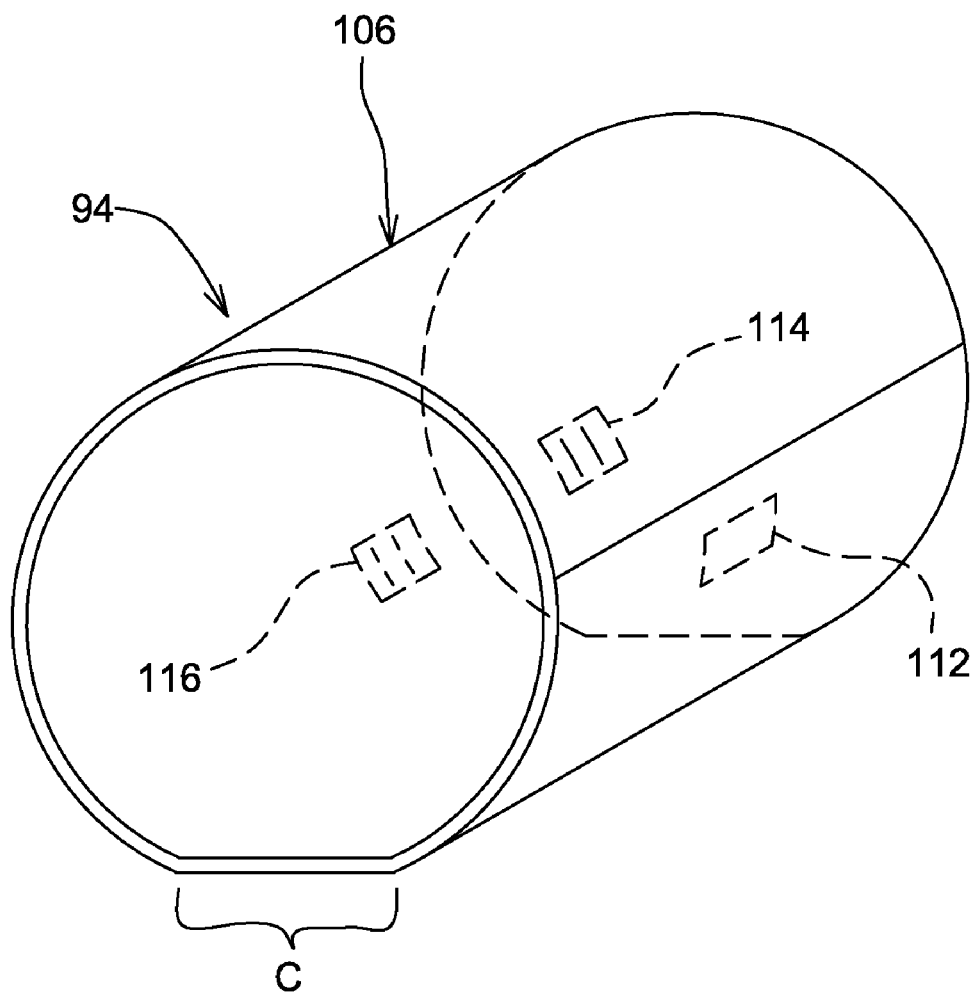
FIG. 4 is a schematic perspective view of a wrapped cotton module showing the location of the three RFID tag assemblies incorporated into the plastic wrapping material.

Referring now to FIG. 4, there is shown the wrapped cotton module 94 lying on the ground. The wrapping material segment 106 is arranged on the module 94 such that the RFID tag assembly 112 is located against the right-hand side of the cotton module at a location just above the ground line, the RFID tag assembly 114 is located between two adjacent wraps of the wrapping material segment 106 at approximately a 2:00 o'clock location adjacent one end of the module 94, and the tag assembly 116 is between adjacent wraps of the wrapping material at a location approximately diametrically opposite from, and adjacent the opposite end of the module 94 from, the tag assembly 114. It can be seen that the module 94 becomes deformed from its cylindrical shape when resting on the ground so as to have a relatively long contact zone C. Because of this, it is possible that the RFID tag assemblies 112 and 114 can both be in ground contact after the module 94 is deposited on the ground by the harvester 10. The position of the RFID tag assembly 116 relative to the tag assemblies 112 and 114 is selected so that it is ensured that at least one of the tag assemblies 112, 114 and 116 is out of ground contact so as to permit it to be read with a hand-held or machine carried tag reader.

Having described the preferred embodiment, it will become apparent that various modifications can be made without departing from the scope of the invention as defined in the accompanying claims.

The invention claimed is:

1. A method of forming modules of material having identification tags applied thereto comprising the steps of:
   a. providing a wrapping material supply roll consisting of a plurality of end-to-end segments, with each segment being a predetermined length for applying a predetermined number of wraps to a formed module having a predetermined diameter, and with each segment having an identification tag affixed thereto at a pre-selected location centered within a leading end section of said segment, whereby, once a module is wrapped, an electronic identification tag reader can be positioned to read said identification tag and in that way apprise an operator of the location of said leading end section of said segment;
   b. forming a cylindrical module having said predetermined diameter; and
   c. wrapping a leading segment of said supply roll about a circumference of said module and severing said leading segment from a next adjoining segment.

2. A module forming and wrapping structure comprising:
   a module forming apparatus including a cylindrical module forming arrangement defining a module forming chamber having an inlet for receiving material to be formed into a module, with the module forming arrangement being operable for forming a module having a predetermined diameter within said chamber;
   a wrapping apparatus loaded with a wrapping material supply roll and including a powered wrapping material feed device for selectively feeding said wrapping material into said module forming chamber in response to a start feed signal;
   a module size sensor operatively associated with said module forming arrangement and coupled for sending a start feed signal to said feed device in response to a module being formed to said predetermined diameter in said chamber;
   said wrapping material including a plurality of segments connected in end-to-end relationship with each other, with each segment being a predetermined length for wrapping a predetermined number of wraps about said module having a predetermined diameter, and with each segment including an electronic identification tag located adjacent a trailing end thereof;
   said wrapping apparatus further including a powered wrapping material separating device;
   a control coupled to said wrapping material separating device and being responsive to a separate signal for effecting operation of said separating device so as to effect separation of a leading segment of said wrapping material supply roll from a next adjacent segment;
   an electronic identification tag reader being located for reading said electronic identification tag and being coupled to said control to send said separate signal when said identification tag is read, whereby said separating device is caused to separate said leading segment from the next adjacent segment at the trailing end of said leading segment.

3. The module forming and wrapping structure, as defined in claim 2, wherein a second electronic identification tag reader is located adjacent said module forming chamber for reading said identification tag only after said leading segment has become wrapped approximately once about said module; with said second identification tag reader being coupled to said control for sending a wrap confirm signal to said control.

4. The module forming and wrapping structure, as defined in claim 3, wherein said control includes a timer coupled for receiving said start feed signal and operative to time-out after a pre-selected elapse of time corresponding to that required for placing said approximately one wrap of said leading segment about said module; and, said control, in the absence of receiving said wrap confirm signal from said second identification tag reader within said pre-selected elapse of time, operating to send a warning signal to the operator that something is amiss with the wrapping operation of the module.

5. A supply roll of wrapping material for use in a cylindrical module wrapping apparatus associated with a cylindrical module forming apparatus, said supply roll comprising: a plurality of end-to-end joined wrapping material segments; each of said segments having a length for wrapping a module having a pre-selected diameter with a pre-selected number of wraps; and at least one electronic identification tag being affixed to each wrapping material segment, wherein the at least one electronic identification tag has a first tag with an identification number and a duplicate tag with the same identification number.

6. The supply roll of wrapping material, as defined in claim 5, wherein said at least one electronic identification tag is placed within a leading end section of each of said segments, considered with respect to a direction of travel of the wrapping material as it is being fed for wrapping a module.

7. The supply roll of wrapping material, as defined in claim 6, wherein at least a second electronic identification tag is placed adjacent a trailing end of each of said wrapping material segments.

8. The supply roll of wrapping material, as defined in claim 7, wherein at least a third electronic identification tag is placed on a location of each of said segments which is approximately halfway between said leading end section and said trailing end.

* * * * *